United States Patent [19]

Leiber

[11] Patent Number: 4,482,192
[45] Date of Patent: Nov. 13, 1984

[54] ANTI-SKID BRAKING APPARATUS

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 395,764

[22] Filed: Jul. 6, 1982

[30] Foreign Application Priority Data

Dec. 24, 1981 [DE] Fed. Rep. of Germany ....... 3151292

[51] Int. Cl.³ .............................................. B60T 8/02
[52] U.S. Cl. .................................... 303/100; 303/119
[58] Field of Search ................ 60/591; 303/93, 95–97, 303/100, 103, 105, 113, 114, 119

[56] References Cited

U.S. PATENT DOCUMENTS 3,999,809 12/1976 Inada et al. ........................ 303/100
4,093,313 6/1978 Burckhardt ..................... 303/100 X Primary Examiner—Duane A. Reger
Attorney, Agent, or Firm—Edwin E. Greigg

[57] ABSTRACT

An anti-skid braking apparatus having a multiple-circuit brake force amplifier is proposed. The brake force amplifier is followed by a 3/2-way magnetic valve which is, inserted into a brake circuit (I) which is closed per se. After a predetermined pressure threshold has been exceeded, the 3/2-way magnetic valve switches over and connects an open brake circuit (II) with the closed brake circuit (I). In this manner, it is advantageously possible to use a closed brake circuit (I), thus enabling the attainment of a small and lightweight structure of the brake force amplifier. It is furthermore easy to recognize defects in the system with the aid of a plurality of switches which are disposed in part on the brake force amplifier, and with the aid of an electronic switching device evaluating the switching signals of these switches. A test circuit for the switches is also possible with the aid of a logic circuit. The anti-skid braking apparatus is preferably applicable to motor vehicles of the medium weight class.

9 Claims, 2 Drawing Figures

ANTI-SKID BRAKING APPARATUS

BACKGROUND OF THE INVENTION

The invention is based on an anti-skid braking apparatus having a multiple-circuit brake force amplifier and wheel brake cylinders supplied thereby, the apparatus further including anti-skid valves disposed between said brake force amplifier and said wheel brake cylinders, with the anti-skid valves arranged to be triggered via an electronic switching device. An anti-skid braking apparatus of this type is known (German Offenlegungsschrift No. 27 03 760).

In this known anti-slip braking apparatus, pressure is fed into the closed brake circuit in accordance with a predetermined piston position in the main brake cylinder, or in accordance with predetermined switch positions of switches disposed on the brake amplifier, which pick up the brake amplifier's various positions. Pressure medium is then fed from the reservoir of an energy supply apparatus into the closed brake circuit in response to appropriate signals, in order to generate braking pressure in that brake circuit.

It is true that such known designs are simple in structure; however, they are extraordinarily vulnerable to failure, because in the event of a failure it is the reservoir pressure and not the braking pressure which is effective in the brake circuit being supplied.

OBJECT AND SUMMARY OF THE INVENTION

The anti-skid braking apparatus has the advantage over the prior art that a closed brake circuit can be used, and in the event of a defect, it is not the reservoir pressure but a braking pressure which is directed into the closed brake circuit. The multiple-circuit brake amplifier furthermore has a lightweight and compact structure, one reason, among others, being that the main cylinder piston needs to be designed merely for an auxiliary braking effect.

In accordance with further characteristics of the invention revealed hereinafter, it is advantageous that only limited expenditure is required for the anti-skid braking apparatus. It is also advantageous that defects in a brake circuit are easy to recognize, furthermore that a test circuit which is conventional in an anti-skid braking apparatus can be used for the monitoring of switches and of a gate-type logic component, and that it is also possible to monitor the switches as to their switching position at a given time.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
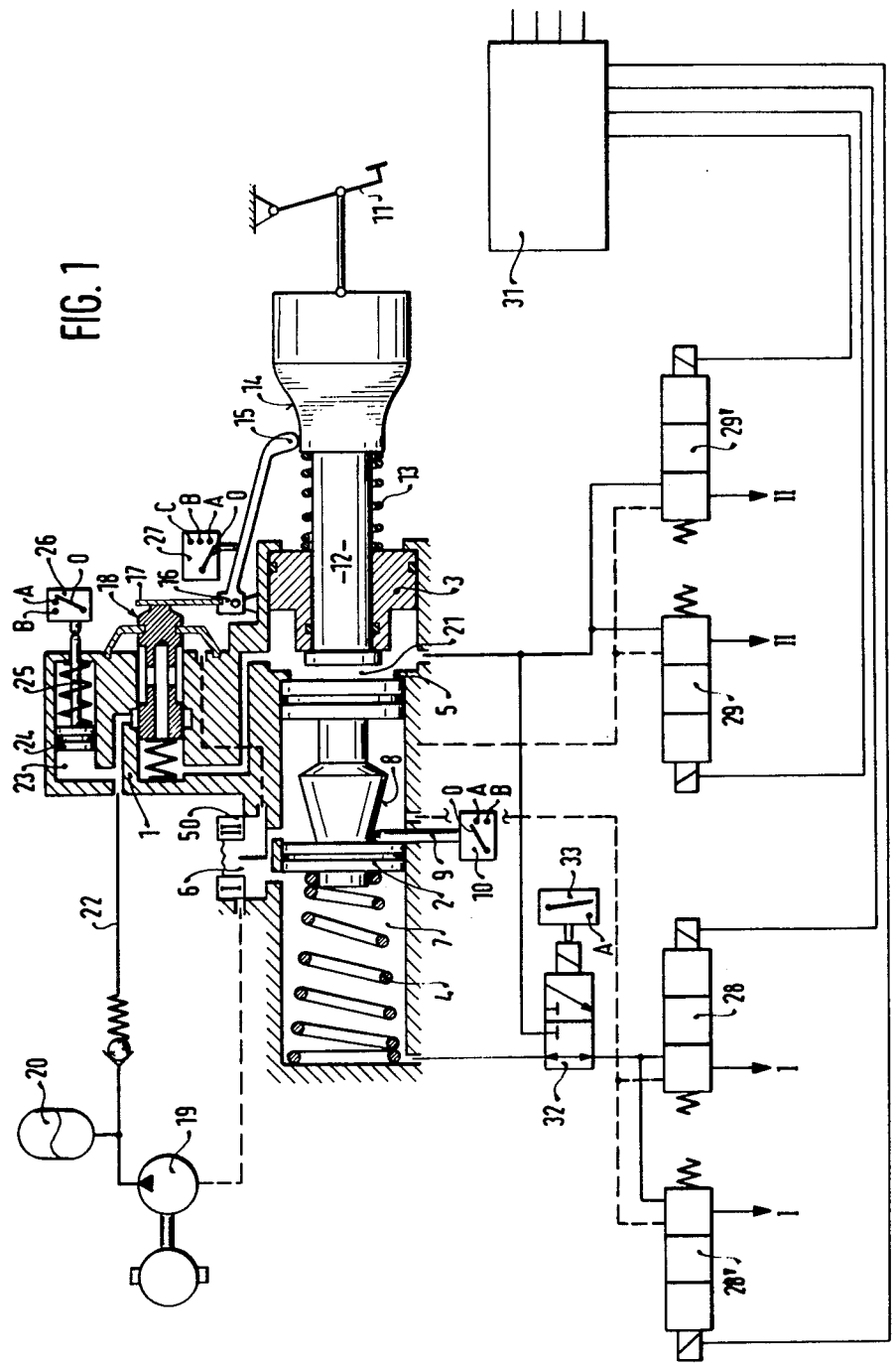
FIG. 1 is a schematic view of an exemplary embodiment of an anti-skid braking apparatus according to the invention.

An anti-skid braking apparatus has a dual-circuit brake force amplifier 1, in which two (tandem) pistons 2 and 3 are disposed one after the other. The forward piston 2 is conventionally fixed to an annular housing shoulder 5 by a restoring spring 4, and in this position it keeps open a connection existing, via an expansion port, between a refill container 6 and a main cylinder work chamber 7. A so-called "closed" brake circuit I is connected to the chamber 7.

The piston 2 has an oblique face 8, onto which a switching pin 9 of a control switch 10 is placed. This switch 10 has an outset position "zero" and two contact positions "A" and "B".

The second piston 3 is an annular piston, which is slidably positioned onto a push rod 12 actuated by a pedal 11. A spring 13 surrounding the push rod 12 is inserted in a prestressed manner between the push rod 12 and the piston 3 such that when the pedal forces are small, both elements 3 and 12 are stressed and do not displace one another.

The push rod 12 is provided with a control contour 14, along which one end 15 of a lever 16 can slide, the other end 17 of the lever 16 being embodied as a leaf spring in order to function as a travel simulator. The end of the leaf spring 17 is intended for actuating a control valve 18. This control valve 18 is located between an energy supply apparatus 19/20, which substantially comprises a pump 19 and a reservoir 20, and the pressure-free refill container 6. The control valve 18 connects a work chamber 21 located between the two pistons 2 and 3 either with a relief location (refill container 6) or with the energy supply apparatus 19/20.

A brake circuit II, which represents a so-called "open" brake circuit, is connected to the work chamber 21. A pressure line 22 leading from the energy supply apparatus 19/20 to the brake amplifier 1 communicates with a work chamber 23, which is defined by a piston 24, which is capable of actuating a second switch 26 via a push rod 25. This switch 26 has a zero outset position and also has two contact positions A and B, and it furthermore has a response hysteresis occasioned by the counteractive force of the spring and by the friction of the piston 24.

The movement of the lever 16 is monitored by a third switch 27, which is capable of assuming a zero outset position as well as three contact positions A, B and C.

The two brake circuits I and II lead, via two each 3/3-way magnetic valves 28, 28' and 29, 29', respectively, to a total of four wheel brake cylinders (not shown), two on the front axle and two on the rear axle of a motor vehicle. Sensors are disposed on the vehicle wheels which furnish their signals to an electronic switching device 31. There the signals are processed and then the magnets of the 3/3-way magnetic valves 28-29 are triggered, in accordance with existing conditions, in order to adapt the brake pressure in the two brake circuits I and II to the characteristics of the rod surface or to the behavior of the wheels. This apparatus comprises an anti-skid braking apparatus 28-31.

A further 3/2-way magnetic valve 32 is located in the brake circuit I and in its illustrated position it has a means connecting it to the brake circuit I. Its second position, attained upon actuation by electric current, effects a blocking of the brake force amplifier, and effects a connection of the (open) brake circuit II (that is, on the side toward the brake force amplifier) to the closed brake circuit I (that is, the one toward the wheel cylinders). A fourth switch 33 is arranged to cooperate with the magnetic valve 32 as well as being adapted to monitor the switching position of the magnetic valve 32 at a given time; to this end, it has a zero outset position and a contact position A. Finally, a further switch 50 is provided on the refill container 6 for detecting the fill quantity.

All five switches 10, 26, 27, 33, 50 are interlinked in a logic circuit—in a manner not shown for the sake of simplicity—and this logical switching device is integrated into the electronic switching device 31.

Mode of Operation

Upon the actuation of the brake pedal 11, first the return flow in the control valve 18 is closed, and then pressure medium is supplied from both work chambers 7 and 21 to brake circuits I and II. In the partial-braking range, in other words, no auxiliary pressure is supplied.

However, given greater pedal pressures, the control valve 18 switches completely over. Now the stored energy becomes effective, which has the advantage that the two main cylinder pistons 2 and 3 can be quite small in dimensions. The dimensioning of the pistons 2 and 3 is in accordance with the auxiliary function, because if there is a failure of the energy supply, a high pressure level cannot be attained anyway because of the restricted pedal forces then available. Accordingly, a smaller volume is fed into the brake circuits.

In the position which the piston 2 in the main cylinder has attained in the event of auxiliary pressure feeding, the 3/2-way magnetic valve 32 is simultaneously switched over, so that the work chamber 7 is closed off and the piston 2 is blocked; this causes the blocking of the push rod 12.

The valve 32 is usually—that is, when the brake is not actuated and during a partial braking—in the open position shown. Its magnet receives current and switches the valve 32 into the other position whenever stronger pedal pressures are exerted and the control valve 18 has switched over from the partial-braking position to the full braking position, or in other words has switched all the way over. Then the energy stored in the reservoir 20 becomes effective and is supplied via the valve 32 to the brakes.

Since in its switched-over position the valve 32 has closed off the work chamber 7, the piston 2 is then blocked. This has the advantage that the pedal cannot be pushed all the way to the floor.

Herein resides a great advantage of the apparatus, because in many known designs functioning with pressure feeding, the pedal push rod can continue to be moved until the brake pedal meets the floor of the vehicle.

On the functioning of the five switches 10, 26, 27, 33 and 50, the following should also be noted:

The switch 10 has the task of sensing the travel of the piston 2. It moves from position O to position A after 20 percent of the possible stroke of the piston 2. This position A thus makes it possible to know that the piston 2 is moving.

The switch 10 attains its position B upon the feeding in of higher pressures, that is, in the full-braking position. Even when the anti-skid system is operating, the switch 10 can be located in position B. Finally, a combination of the switching signals of switches 10 and 27 (each in position B) is used in order to detect a failure of a brake circuit or poor evacuation of air.

By means of a specialized embodiment of the control contour 14, it is attained that the failure of a brake circuit or a defective main seal in the brake force amplifier 1 can be detected via a corresponding switching signal combination, with the result that the feeding of pressure medium is then shut off.

At the switch 26, the pressure of the reservoir 20, in contact position A, effects the switching on of the pump 19, and in contact position B a warning signal is produced, because then the reservoir pressure has dropped excessively. This device is important for safety reasons, and it may be made redundant in structure if desired.

The switch 10 responds when approximately 20% of the possible piston stroke has been executed (contact position A). It attains its contact position B after about 40% of the piston stroke has been executed.

The switch 27 on the lever 16, in contact position A, switches on the brake light. Contact position B corresponds to the partial-braking position at average braking pressures, and contact position C is attained only at relatively high braking pressures.

When the magnetic valve 32 is operating, the switch 33 responds, mechanically picking up the valve position and serving to monitor the correct functioning of this magnetic valve 32.

Figure 2:
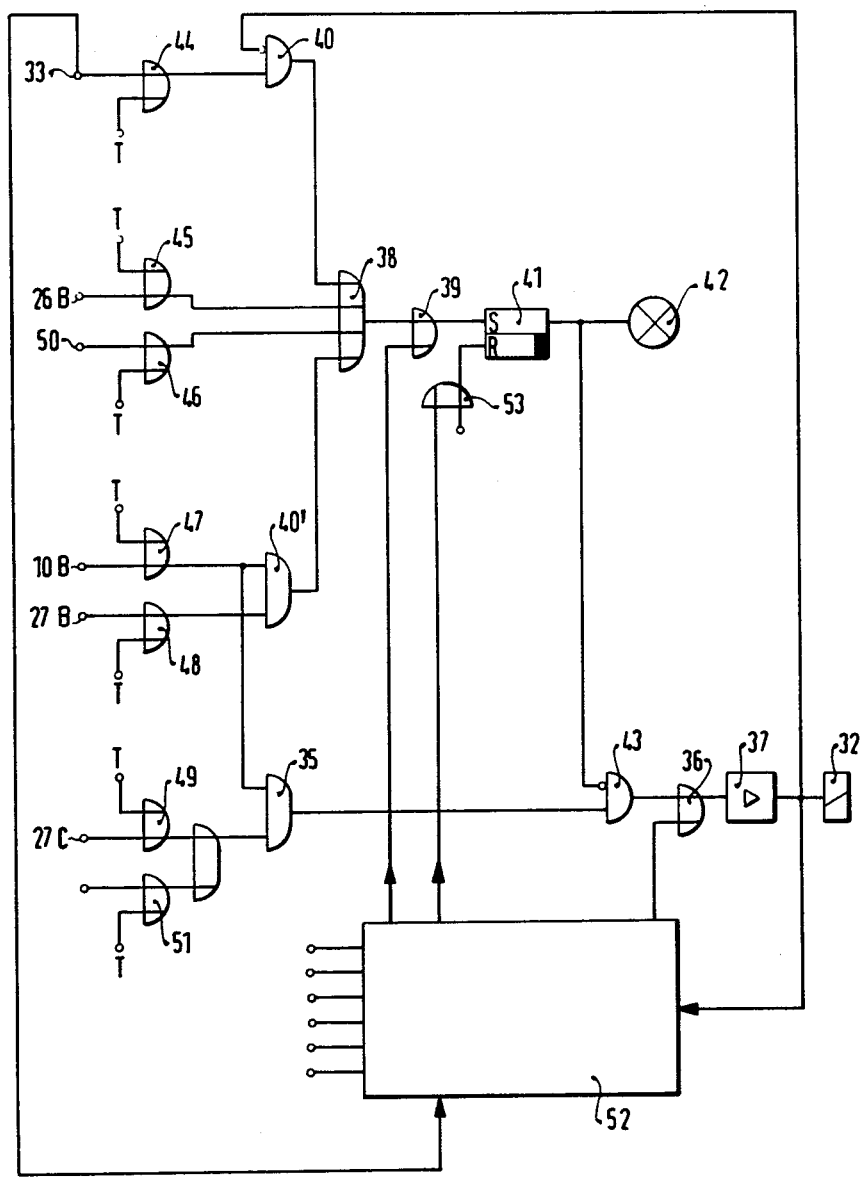
FIG. 2 is a circuit diagram of a logic circuit.

The logic circuit shown in FIG. 2 is associated with the electronic switching device 31. The logic circuit has on its left-hand (input) side the signals of the switches 33, 26, 50, 10 and 27 and on the right-hand (output) side the 3/2-way magnetic valve 32. Disposed subsequent to the switch signals are OR gates 44, 45, 46, 47, 48, 49 and 51, by way of each of which a test signal T of a test circuit 52 can also be introduced. Disposed subsequent to the OR gates 47, 48 or 49, 51, respectively, are respective AND gates 40' and 35; the AND gate 35 is carried via a further AND gate 43 having a negative input and via an OR gate 36 to a power output stage 37, and from there to the magnetic valve 32.

A central OR gate 38 is also provided, which is triggerable with signals from the AND gates 40' and 40 and from the OR gates 45 and 46. Behind the central OR gate 38, there is a further OR gate 39, which can also be triggered by the test circuit 52. Next, an OR gate 53 is provided, which can be triggered either by the test circuit 52 or by a repairshop test signal. An error memory 41 and a warning light 42 are provided following the OR gates 39 and 53.

In terms of the mode of operation, the following features should be noted:

The feeding of pressure medium at relatively high braking pressures is effected at the switch contact positions 27C and 10B. The corresponding switching signals act upon the AND gate 35, which via the second AND gate 43 having the negated input triggers the power output stage 37 of the 3/2-way magnetic valve 32. It is possible for the anti-skid system to function already at relatively low braking pressures, for instance when driving on ice; the effect in the brake circuit I is that in order to reduce the pressure, pressure medium is allowed to escape from the brake circuit into a return flow line, in which the 3/3-way magnetic valve 28 or 28' of FIG. 1 assumes the appropriate switching position. In order to increase the pressure subsequently, the piston 2 moves in increments. In the course of the individual regulating cycles, the piston 2 then attains a position which effects the contact position B at the switch 10. Here again, a feeding of pressure still occurs, because the anti-skid signal is present at the OR gate 39 by way of the OR gate 38.

Various defects preclude the feeding of pressure from brake circuit II into brake circuit I.

The monitoring of the 3/2-way magnetic valve 32 via the switch 33 was mentioned at the outset above. This monitoring is important and has to do with safety, because if there is a failure in brake circuit I and a defective magnetic valve 32 (for instance in the valve becomes stuck in one switching position), the pressure medium from brake circuit II may be exhausted, and then both brake circuits I and II will fail.

Should the magnetic valve 32 stick in the manner just referred to, this event is detected by means of the gate combination shown in the upper portion of FIG. 2.

For instance, if there is no trigger signal for the magnetic valve 32 and if the switch 33 is in the contact position, then this is an indication of an error. An output signal of the AND gate 40 shown in FIG. 2 then proceeds via the OR gate 38 to the error memory 41, which is then set. An output signal of the error memory 41 triggers the warning light 42 and at the same time blocks the AND gate 43 for pressure feeding, so that no pressure is fed via the magnetic valve 32.

The same blocking effect is produced by the switch signals if these indicate an excessively low reservoir pressure (26B) or an excessively low level (switch 50) in the supply container 6 of FIG. 1. These signals also reach the error memory 41 via the OR gate 38.

A combination of the switch signals 10B and 27B is used in order to detect a brake circuit failure or poor ventilation in brake circuit I. If in a partial-braking range (switch contact position 27B) the piston 2 has already traveled far into a position corresponding to the switch contact position 10B, then a setting of the error memory 41 and accordingly a blocking of pressure feeding take place. Since this portion of the gate-type logic component is relevant in terms of safety, it is likewise monitored, like those gates of the anti-skid braking apparatus which are important in terms of safety, by the test circuit 52. The test signals therefore act via the OR gates 44, 45, 46, 47, 48, 49, 51 upon the switch signal line, and these signals in turn activate the individual gates in a predetermined sequence specified by the test program, finally causing the triggering of the 3/2-way magnetic valve 32. The functioning of the error memory 41 is also taken separately into consideration in the test circuit 52 or is monitored separately by the test circuit 52.

Resetting of the error memory 41 occurs only as a result of the action of the test signal or in a repair shop using an appropriate testing appliance.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An anti-skid braking apparatus having a multiple-circuit brake force amplifier and wheel brake cylinders supplied thereby, said apparatus further including anti-skid valves disposed between said brake force amplifier and said wheel brake cylinders, said anti-skid valves being triggerable via an electronic switching device, characterized in that there is disposed in at least one brake circuit (I or II) an additional 3/2-way magnetic valve, which is triggerable via the electronic switching device by means of switching signals derived from the status of said brake amplifier at a particularly time via appropriate switching means, and said 3/2-way magnetic valve further including an electric-current-actuated switching position in which a supply-effecting connection can be established between said other brake circuit (II or I, respectively) and the first brake circuit (I or II).

2. An anti-skid braking apparatus as defined by claim 1, characterized in that said brake circuit (I) which is provided with said 3/2-way magnetic valve is located in a brake circuit which is closed per se.

3. An anti-skid braking apparatus as defined by claim 1 or 2, characterized in that said 3/2-way magnetic valve is triggerable after a predetermined pressure threshold in said brake force amplifier has been exceeded.

4. An anti-skid braking apparatus as defined by claim 2 or 3, characterized in that said 3/2-way magnetic valve further includes an electric-current-actuated switchover position, said switchover position being adapted to assume a blocking position, on the side toward the brake force amplifier, for the closed brake circuit (I).

5. An anti-skid braking apparatus as defined by claim 1, characterized in that said brake force amplifier further includes a plurality of electrical switches, the switching signals of which are evaluatable in said electronic switching device, whereby recognition and indication of brake circuit failure or poor ventilation of one brake circuit and/or failure of the brake circuit amplification is attainable.

6. An anti-skid braking apparatus as defined by claim 1 or 2 characterized in that said 3/2-way magnetic valve has a feed pressure which is blockable in the event of a defect in said brake system.

7. An anti-skid braking apparatus as defined by claim 1, characterized in that said brake force amplifier further includes at least one electrical switch provided with a piston means, said piston means subject to the pressure of an energy supply apparatus comprising a pump and a reservoir, said piston means further arranged to be retarded in its response by means of friction and spring counterforce.

8. An anti-skid braking apparatus as defined by claim 1 or 2, characterized in that said switching means are provided in said electronic switching device, said switching means further including a gate-type logic component which is monitorable in a test circuit.

9. An anti-skid braking apparatus as defined by claim 1 or 2, characterized in that said switching means are provided in said electronic switching device, said switching means further including means to monitor said 3/2-way magnetic valve.

* * * * *